United States Patent
Xu et al.

(10) Patent No.: US 10,884,562 B2
(45) Date of Patent: Jan. 5, 2021

(54) TOUCH SUBSTRATE, TOUCH CONTROL DISPLAY PANEL, AND TOUCH CONTROL DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jiawei Xu, Beijing (CN); Bisheng Li, Beijing (CN); Lei Zhang, Beijing (CN); Tsungchieh Kuo, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 416 days.

(21) Appl. No.: 15/761,353

(22) PCT Filed: Apr. 14, 2017

(86) PCT No.: PCT/CN2017/080577
§ 371 (c)(1),
(2) Date: Mar. 19, 2018

(87) PCT Pub. No.: WO2018/188075
PCT Pub. Date: Oct. 18, 2018

(65) Prior Publication Data
US 2020/0249793 A1 Aug. 6, 2020

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05);
(Continued)

(58) Field of Classification Search
None
See application file for complete search history.

(56) References Cited

U.S. PATENT DOCUMENTS

| 2014/0009428 A1* | 1/2014 | Coulson | G06F 3/044 |
| | | | 345/174 |
| 2016/0299611 A1 | 10/2016 | Park | |
| 2018/0129352 A1* | 5/2018 | Kim | G06F 3/0412 |

FOREIGN PATENT DOCUMENTS

| CN | 203232406 U | 10/2013 |
| CN | 103440060 A | 12/2013 |

(Continued)

OTHER PUBLICATIONS

International Search Report & Written Opinion dated Jan. 11, 2018, regarding PCT/CN2017/080577.

*Primary Examiner* — Stephen T. Reed
(74) *Attorney, Agent, or Firm* — Intellectual Valley Law, P.C.

(57) ABSTRACT

The present application discloses a touch control display panel including a base substrate; an auxiliary electrode layer on the base substrate; an insulating layer on a side of the auxiliary electrode layer distal to the base substrate; and a first touch electrode layer and a second touch electrode layer on a side of the insulating layer distal to the auxiliary electrode layer. The first touch electrode layer and the auxiliary electrode layer are electrically connected in parallel; and the second touch electrode layer is insulated from the first touch electrode layer and the auxiliary electrode layer.

18 Claims, 10 Drawing Sheets

(52) U.S. Cl.
CPC .............. *G06F 2203/04107* (2013.01); *G06F 2203/04111* (2013.01)

(56) References Cited

FOREIGN PATENT DOCUMENTS

| | | |
|---|---|---|
| CN | 205247009 U | 5/2016 |
| CN | 105810677 A | 7/2016 |
| CN | 106339143 A | 1/2017 |

\* cited by examiner

TOUCH SUBSTRATE, TOUCH CONTROL DISPLAY PANEL, AND TOUCH CONTROL DISPLAY APPARATUS

CROSS-REFERENCE TO RELATED APPLICATION

This application is a national stage application under 35 U.S.C. § 371 of International Application No. PCT/CN2017/080577, filed Apr. 14, 2017, the contents of which are incorporated by reference in the entirety.

TECHNICAL FIELD

The present invention relates to touch control display technology, more particularly, to a touch substrate, a touch control display panel, and a touch control display apparatus.

BACKGROUND

Touch display panels have found a wide range of applications in the display field such as mobile phones, computer display panels, touch screens, satellite navigation devices, and digital cameras. Touch display panels can be categorized into three classes: add-on mode touch panels, on-cell touch panels, and in-cell touch panels. Touch display panels may be a self-capacitive type or a mutual capacitive type touch display panel. Conventional touch control display panels typically use indium tin oxide (ITO) as the touch electrode material.

SUMMARY

In one aspect, the present invention provides a touch control display panel comprising a base substrate; an auxiliary electrode layer on the base substrate; an insulating layer on a side of the auxiliary electrode layer distal to the base substrate; and a first touch electrode layer and a second touch electrode layer on a side of the insulating layer distal to the auxiliary electrode layer; wherein the first touch electrode layer and the auxiliary electrode layer are electrically connected in parallel; and the second touch electrode layer is insulated from the first touch electrode layer and the auxiliary electrode layer.

Optionally, the touch control display panel further comprises a display module on a side of the base substrate distal to the auxiliary electrode layer; wherein the auxiliary electrode layer configured to at least partially shield the second touch electrode layer from noise signals generated in the display module.

Optionally, the first touch electrode layer comprises a plurality of first touch electrodes, each of which extending substantially along a first direction; the second touch electrode layer comprises a plurality of second touch electrodes, each of which extending substantially along a second direction; the plurality of first touch electrodes and the plurality of second touch electrodes crossing over each other forming a plurality of intersections; the auxiliary electrode layer comprises a plurality of auxiliary electrodes extending substantially along the first direction; and each of the plurality of auxiliary electrodes and one of the plurality of first touch electrodes are electrically connected in parallel.

Optionally, the touch control display panel further comprises a plurality of touch signal lines, each of which electrically connected to one of the plurality of first touch electrodes and one of the plurality of auxiliary electrodes at a contact pad.

Optionally, each of the plurality of auxiliary electrodes has a shape different from that of one of the plurality of first touch electrodes.

Optionally, each of the plurality of auxiliary electrodes has a shape substantially the same as that of one of the plurality of first touch electrodes; and projections of the plurality of auxiliary electrodes on the base substrate substantially overlap with those of the plurality of first touch electrodes.

Optionally, the touch control display panel further comprises a first bridge layer and a second bridge layer; wherein each of the plurality of first touch electrodes comprises a plurality of first electrode blocks along the first direction, adjacent first electrode blocks spaced apart from each other at one of the plurality of intersections; the first bridge layer comprises a plurality of first bridges, each of which at one of the plurality of intersections, the adjacent first electrode blocks electrically connected to each other through one of the plurality of first bridges; each of the plurality of second touch electrodes comprises a plurality of second electrode blocks along the second direction, adjacent second electrode blocks spaced apart from each other at one of the plurality of intersections; and the second bridge layer comprises a plurality of second bridges, each of which at one of the plurality of intersections, the adjacent second electrode blocks electrically connected to each other through one of the plurality of first bridges.

Optionally, the plurality of second bridges and the plurality of second electrode blocks are in a same layer; the plurality of first bridges are on a side of insulating layer distal to the plurality of first electrode blocks; and the adjacent first electrode blocks electrically connected to the one of the plurality of first bridges through vias extending through the insulating layer.

Optionally, the touch control display panel further comprises a third bridge layer; wherein each of the plurality of auxiliary electrodes comprises a plurality of auxiliary electrode blocks along the first direction, adjacent auxiliary electrode blocks spaced apart from each other at one of the plurality of intersections; the third bridge layer comprises a plurality of third bridges, each of which at one of the plurality of intersections, the adjacent auxiliary electrode blocks electrically connected to each other through one of the plurality of third bridges.

Optionally, the plurality of third bridges, the plurality of auxiliary electrode blocks, and the plurality of first bridges are in a same layer; the adjacent first electrode blocks electrically connected to the one of the plurality of first bridges through vias extending through the insulating layer; and each of the plurality of third bridges and each of the plurality of first bridges at each of the plurality of intersections are insulated from each other.

Optionally, a projection of each of the plurality of auxiliary electrodes on the base substrate substantially overlaps with that of one of the plurality of first touch electrodes.

Optionally, a projection of each of the plurality of first touch electrodes on the base substrate completely covers that of one of the plurality of auxiliary electrodes.

Optionally, each of the plurality of auxiliary electrodes comprises a bar extending substantially along the first direction; and the bar and the one of the plurality of first touch electrodes are electrically connected in parallel.

Optionally, each of the plurality of auxiliary electrodes comprises a plurality of bars, each of which extending substantially along the first direction; and each of the plurality of bars and the one of the plurality of first touch electrodes are electrically connected in parallel.

Optionally, the touch control display panel further comprises a first bridge layer and a second bridge layer; wherein each of the plurality of first touch electrodes comprises a plurality of first electrode blocks along the first direction, adjacent first electrode blocks spaced apart from each other at one of the plurality of intersections; the first bridge layer comprises a plurality of first bridges, each of which at one of the plurality of intersections, the adjacent first electrode blocks electrically connected to each other through one of the plurality of first bridges; each of the plurality of second touch electrodes comprises a plurality of second electrode blocks along the second direction, adjacent second electrode blocks spaced apart from each other at one of the plurality of intersections; and the second bridge layer comprises a plurality of second bridges, each of which at one of the plurality of intersections, the adjacent second electrode blocks electrically connected to each other through one of the plurality of first bridges.

Optionally, the bar and the plurality of first bridges are in a same layer; and the bar is insulated from the plurality of first bridges.

Optionally, the first touch electrode layer is a touch scanning electrode layer and the second touch electrode layer is a touch sensing electrode layer.

Optionally, the plurality of touch signal lines are a plurality of touch scanning signal lines; the plurality of first touch electrodes are a plurality of touch scanning electrodes and the plurality of second touch electrodes are a plurality of touch sensing electrodes.

In another aspect, the present invention provides a touch control display apparatus comprising the touch control display panel described herein.

In another aspect, the present invention provides a touch substrate comprising a base substrate; an auxiliary electrode layer on the base substrate; an insulating layer on a side of the auxiliary electrode layer distal to the base substrate; and a first touch electrode layer and a second touch electrode layer on a side of the insulating layer distal to the auxiliary electrode layer; wherein the first touch electrode layer and the auxiliary electrode layer are electrically connected in parallel; and the second touch electrode layer is insulated from the first touch electrode layer and the auxiliary electrode layer.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
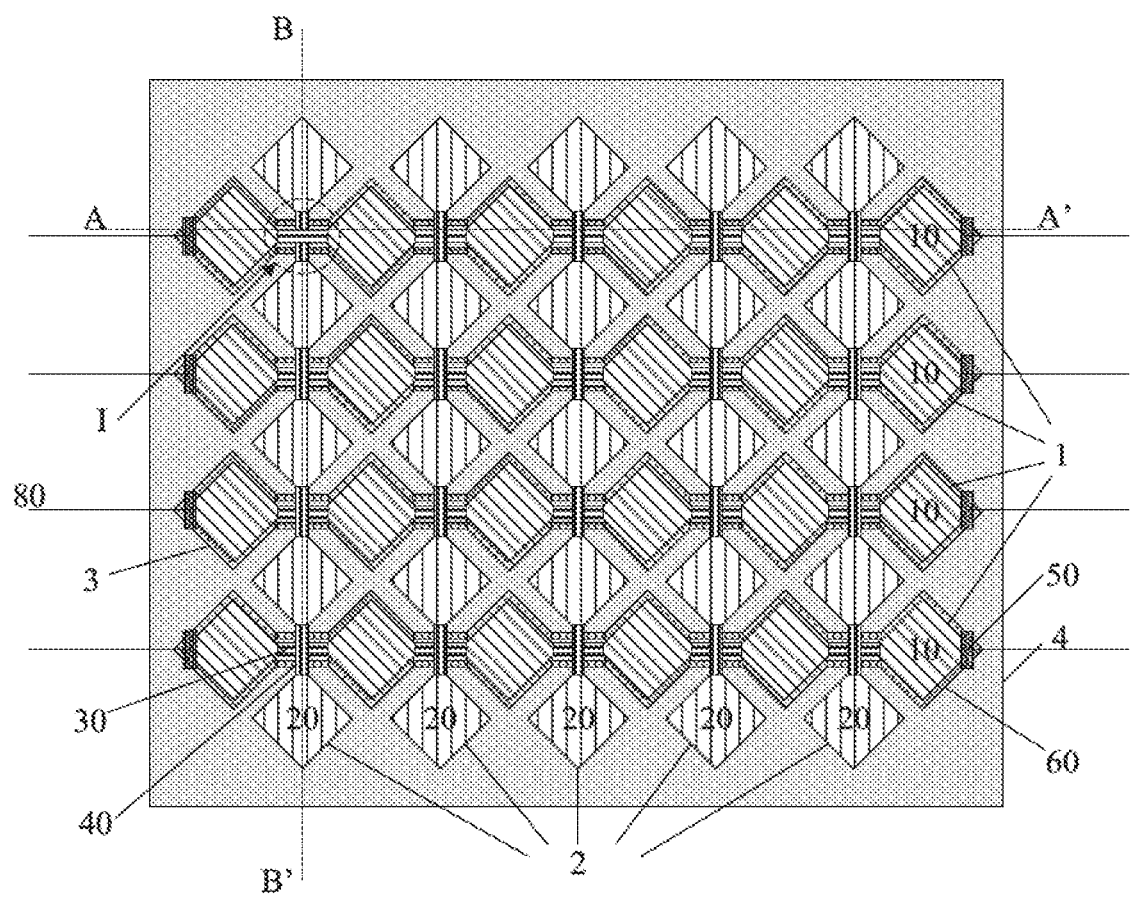
FIG. 1 is a schematic diagram illustrating the structure of a touch control display panel in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional touch control display panels, the touch electrode is made of a material (e.g., indium tin oxide) having a certain electrical resistance. Particularly in a large size display panel, the electrical resistance of the touch electrode becomes an issue for effectively transmitting touch signal, adversely affecting touch control performance. One way to decrease electrical resistance of the touch electrodes is to use a touch electrode layer having a larger thickness. However, this approach significantly affects light transmission rate of the touch control display panel.

In a typical mutual capacitive type touch control display panel, the touch scanning electrodes and the touch sensing electrodes are patterned in a same layer. The touch sensing electrodes in the conventional touch control display panels may be affected by noise signals produced in the display panel. Because the touch sensing electrodes and the touch scanning electrodes are formed in, a same layer, the touch sensing electrodes are not effectively shielded from the noise signals.

Accordingly, the present disclosure provides, inter alia, a touch substrate, a touch control display panel, and a touch control display apparatus that substantially obviate one or more of the problems due to limitations and disadvantages of the related art. In one aspect, the present disclosure provides a touch control display panel. In some embodiments, the touch control display panel includes a base substrate; an auxiliary electrode layer on the base substrate; an insulating layer on a side of the auxiliary electrode layer distal to the base substrate; and a first touch electrode layer and a second touch electrode layer on a side of the insulating layer distal to the auxiliary electrode layer. Optionally, the first touch electrode layer and the auxiliary electrode layer are electrically connected in parallel. Optionally, the second touch electrode layer is insulated from the first touch electrode layer and the auxiliary electrode layer. Optionally, the first touch electrode layer is a touch scanning electrode layer and the second touch electrode layer is a touch sensing electrode layer. Optionally, the first touch electrode layer, the second touch electrode layer, and the auxiliary electrode layer are made of transparent electrode materials, indium tin oxide, graphene, nano-silver, etc. Optionally, the touch control display panel is an on-cell touch control display panel. Optionally, the touch control display panel is an in-cell touch control display panel. Optionally, the touch control display panel is an add-on type touch control display panel. Optionally, the touch control display panel is a one-glass-solution type touch control display panel. Optionally, the touch control display panel is a glass-film-film type touch control display panel.

Figure 2:
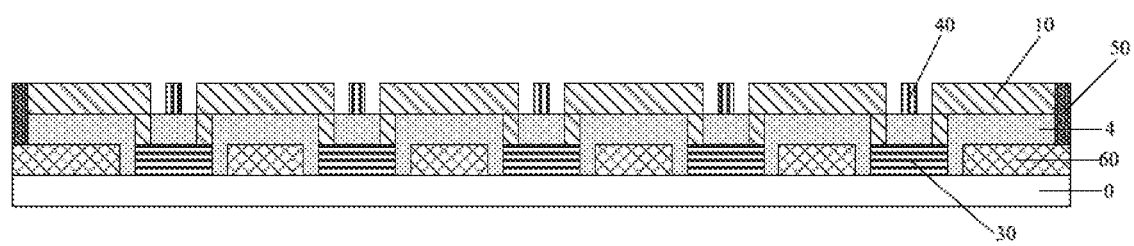
FIG. 2 is a cross-sectional view along the A-A' line of the touch control display panel in FIG. 1.
Figure 3:
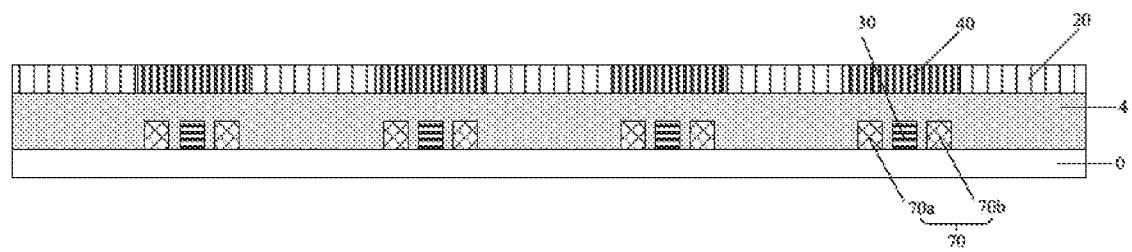
FIG. 3 is a cross-sectional view along the B-B' line of the touch control display panel in FIG. 1.
Figure 4:
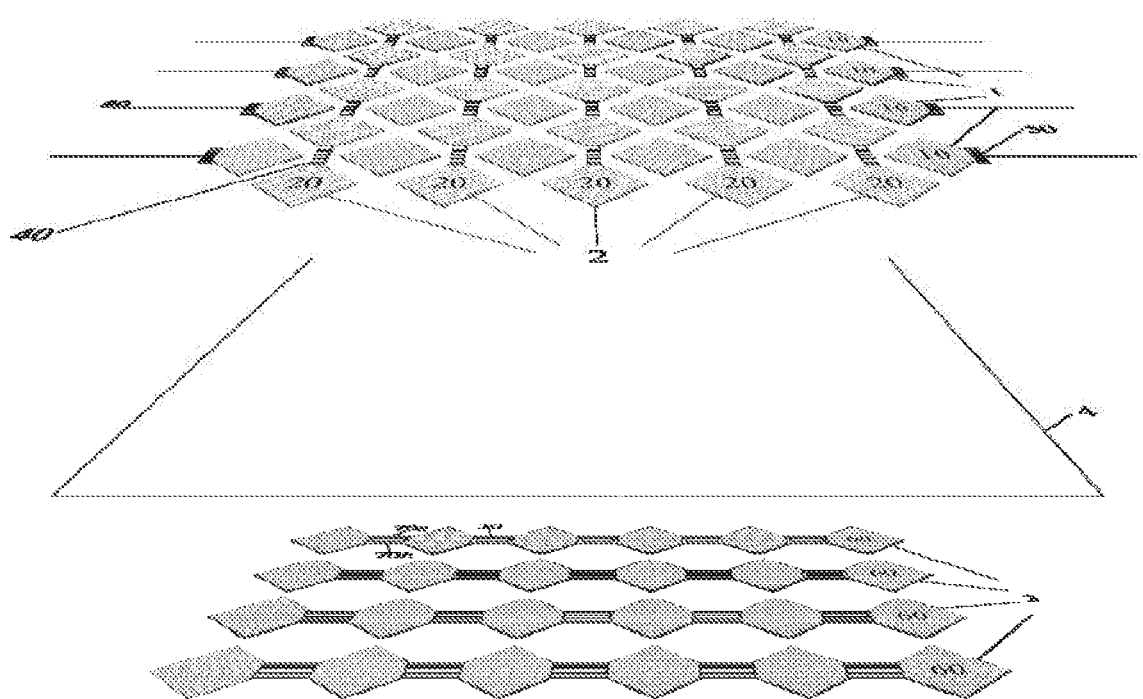
FIG. 4 is a perspective view of the touch control display panel in FIG. 1.
Figure 5:
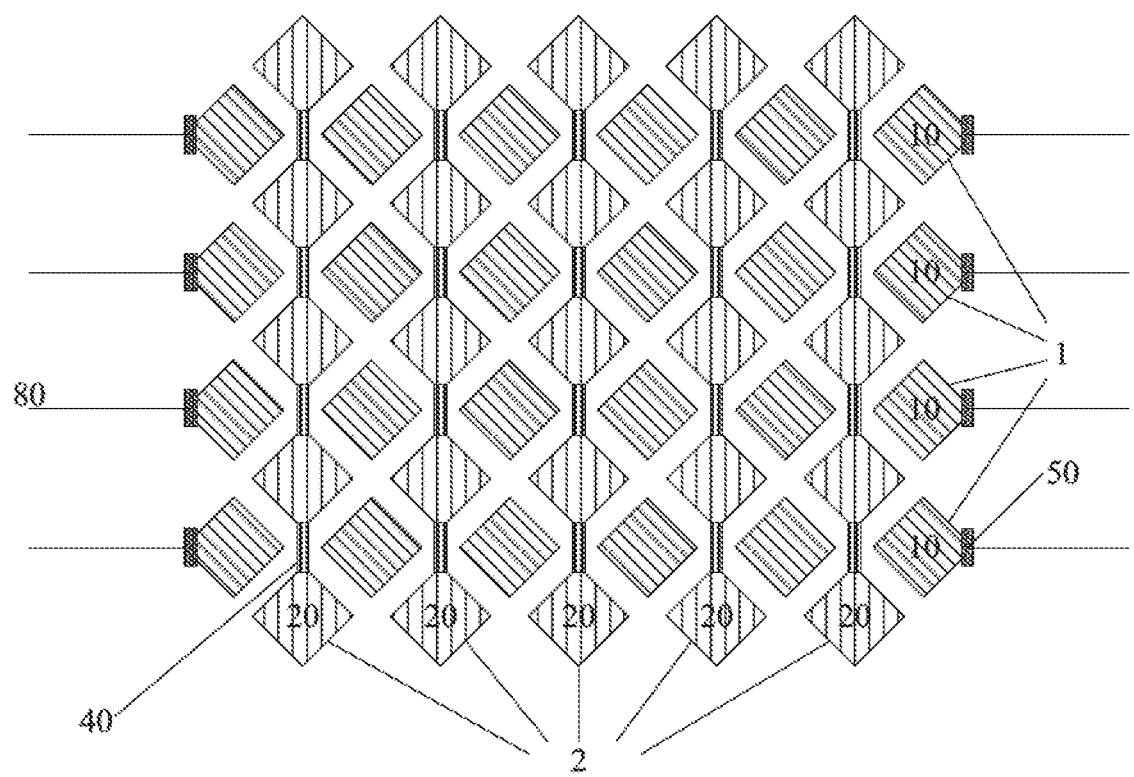
FIG. 5 is a schematic diagram illustrating the structure of the first touch electrode layer and the second touch electrode layer of the touch control display panel in FIG. 1.
Figure 6:
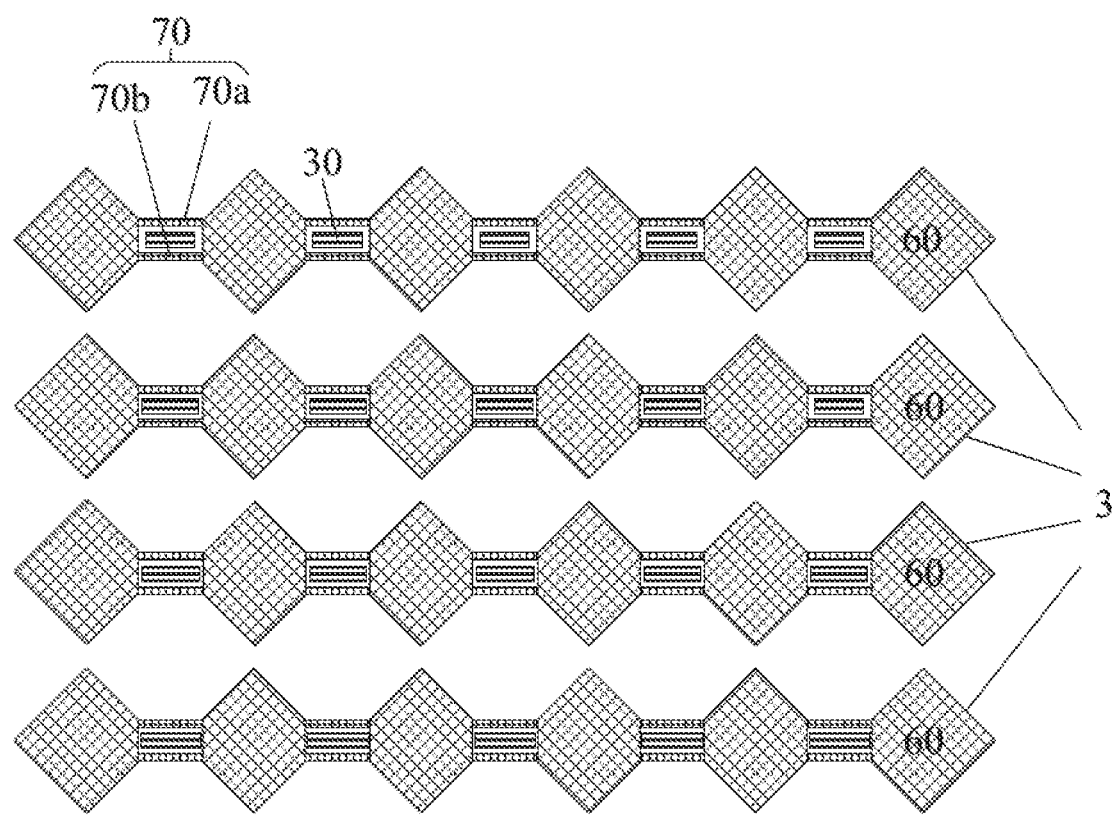
FIG. 6 is a schematic diagram illustrating the structure of the auxiliary electrode layer of the touch control display panel in FIG. 1.

FIG. 1 is a schematic diagram illustrating the structure of a touch control display panel in some embodiments according to the present disclosure. FIG. 2 is a cross-sectional view along the A-A' line of the touch control display panel in FIG. 1. FIG. 3 is a cross-sectional view along the B-B' line of the touch control display panel in FIG. 1. FIG. 4 is a perspective view of the touch control display panel in FIG. 1. FIG. 5 a schematic diagram illustrating the structure of the first touch electrode layer and the second touch electrode layer of the touch control display panel in FIG. 1. FIG. 6 a schematic diagram illustrating the structure of the auxiliary electrode layer of the touch control display panel in FIG. 1. Referring to FIGS. 1-6, the touch control display panel in some embodiments includes a base substrate 0; an auxiliary electrode layer 3 on the base substrate 0; an insulating layer 4 on a side of the auxiliary electrode layer 3 distal to the base substrate 0; and a first touch electrode layer 1 and a second touch electrode layer 2 on a side of the insulating layer 4 distal to the auxiliary electrode layer 3.

By having an auxiliary electrode layer 3 electrically connected in parallel with the first touch electrode layer 1, the electrical resistance for driving a touch signal through the first touch electrode layer 1 can be significantly reduced. The electrical resistance R of the combined structure can be calculated according to the following equation:

$$\frac{1}{R} = \frac{1}{R1} + \frac{1}{R3}; \quad (1)$$

wherein R1 is the electrical resistance of the first touch electrode layer 1, and R2 is the electrical resistance of the auxiliary electrode layer 3. When R2<<R1, the electrical resistance R of the combined structure can be made much smaller than the electrical resistance R1 of the first touch electrode layer 1. Thus, the electrical resistance for driving a touch signal through the first touch electrode layer 1 can be significantly reduced. In a large size touch control display panel having the combined structure, the touch signal can be easily transmitted throughout the entire display panel without signal deterioration, resulting in much enhance touch control performance. In one example, the first touch electrode layer 1 is a touch scanning electrode layer, and the touch signals transmitted through the first touch electrode layer 1 are touch scanning signals, in another example, the first touch electrode layer 1 is a touch sensing electrode layer, and the touch signals transmitted through the first touch electrode layer 1 are touch sensing signals.

The base substrate 0 in some embodiments is a base substrate of a display module. For example, the touch control display panel in some embodiments further includes a display module on a side of the base substrate 0 distal to the auxiliary electrode layer 3. By having an auxiliary electrode layer 3 on a side of the insulating layer distal to the second touch electrode layer 2, the second touch electrode layer 2 can be shielded from noise signals generated in the display module. Because the auxiliary electrode layer 3 is electrically connected to the first touch electrode layer 1, the presence of the auxiliary electrode layer 3 does not produce additional parasitic capacitance.

Retelling to FIGS. 1 to 6, the first touch electrode layer 1 includes a plurality of first touch electrodes 10, each of which extending substantially along a first direction. The second touch electrode layer 2 in some embodiments includes a plurality of second touch electrodes 20, each of which extend ng substantially along a second direction. The plurality of first touch electrodes 10 and the plurality of second touch electrodes 20 cross over each other forming a plurality of intersections I. The auxiliary electrode layer 3 includes a plurality of auxiliary electrodes 60 extending substantially along the first direction. The plurality of auxiliary electrodes 60 and the plurality of second touch electrodes 20 cross over each other at the plurality of intersections I. Each of the plurality of auxiliary electrodes 60 and one of the plurality of first touch electrodes 10 are electrically connected in parallel.

In some embodiments, the touch control display panel further includes a plurality of touch signal lines 80, each of which electrically connected to one of the plurality of first touch electrodes 10 and one of the plurality of auxiliary electrodes 60 at a contact pad 50. Referring to FIG. 2, the contact pad 50 extends through the insulating layer 4, connecting one of the plurality of first touch electrodes 10 and one of the plurality of auxiliary electrodes 60 along a first edge of the first touch electrode layer 1. Optionally, along a second edge opposite to the first edge, the touch control display panel further includes a contact pad 50 connecting one of the plurality of first touch electrodes 10 and one of the plurality of auxiliary electrodes 60 along the second edge.

Optionally, the first touch electrode layer 1 and the auxiliary electrode layer 3 may be electrically connected in parallel at positions other than the contact pad 50. In one example, one of the plurality of first touch electrodes 10 may be electrically connected to one of the auxiliary electrodes 60 through a via extending through the insulating layer 4. Optionally, each of the plurality of auxiliary electrodes 60 has a substantially the same length along the first direction as that of each of the plurality of first touch electrodes 10. Optionally, one of the plurality of auxiliary electrodes 60 has a length along the first direction shorter than that of one of the plurality of first touch electrodes 10, e.g., one of the plurality of auxiliary electrodes 60 is electrically connected to a portion (e.g., a middle portion) of one of the plurality of first touch electrodes 10.

Each of the plurality of auxiliary electrodes 60 may have various appropriate shape. Optionally, each of the plurality of auxiliary electrodes 60 has a shape different from that of one of the plurality of first touch electrodes 10. Optionally, projections of the plurality of auxiliary electrodes 60 on the base substrate 0 are at least partially outside those of the plurality of first touch electrodes 10. Optionally, each of the plurality of auxiliary electrodes 60 has a shape substantially the same as that of one of the plurality of first touch electrodes 10. Optionally, projections of the plurality of auxiliary electrodes 60 on the base substrate 0 substantially overlap with those of the plurality of first touch electrodes 10. Optionally, projections of the plurality of first touch electrodes 10 on the base substrate 0 completely cover those of the plurality of auxiliary electrodes 60. Optionally, projections of the plurality of auxiliary electrodes 60 on the base substrate 0 completely cover those of the plurality of first touch electrodes 10. Optionally, each of the plurality of auxiliary electrodes 60 has a shape and dimensions that result in a small electrical resistance.

In some embodiments, the touch control display panel further includes a first bridge layer and a second bridge layer. Referring, to FIGS. 1 to 5, in some embodiments, the first bridge layer includes a plurality of first bridges 30, and the second bridge layer includes a plurality of second bridges 40. Each of the plurality of first bridges 30 is at one of the plurality of intersections I. Each of the plurality of second bridges 40 is at one of the plurality of intersections I. Each of the plurality of first touch electrodes 10 includes a plurality of first electrode blocks along the first direction, adjacent first electrode blocks spaced apart from each other at one of the plurality of intersections I. Each of the plurality of second touch electrodes 20 includes a plurality of second electrode blocks along the second direction, adjacent second electrode blocks spaced apart from each other at one of the plurality of intersections I. As shown in FIGS. 1 to 5, the adjacent first electrode blocks are electrically connected to each other through one of the plurality of first bridges 30; and the adjacent second electrode blocks are electrically connected to each other through one of the plurality of second bridges 40.

In some embodiments, the plurality of second bridges 40 and the plurality of second electrode blocks are in a same layer. Optionally, the plurality of first electrode blocks, the plurality of second electrode blocks, and the plurality of second bridges 40 are all in a same layer; and the plurality of first bridges 30 are in a different layer, in one example, and as shown in FIGS. 1 to 5, the plurality of second bridges 40 and the plurality of second electrode blocks are in a same layer; the plurality of first bridges 30 are on a side of insulating layer 4 distal to the plurality of first electrode blocks; and the adjacent first electrode blocks are electrically connected to the one of the plurality of first bridges 30 through vias extending through the insulating layer 4.

In some embodiments, the plurality of first bridges 30 and the plurality of second electrode blocks are in a same layer. Optionally, the plurality of first electrode blocks, the plurality of second electrode blocks, and the plurality of first bridges 30 are all in a same layer; and the plurality of second bridges 40 are in a different layer. In one example, the plurality of first bridges 30, the plurality of first electrode blocks, and the plurality of second electrode blocks are in a same layer; the plurality of second bridges 40 are on a side of insulating layer 4 distal to the plurality of second electrode blocks; and the adjacent second electrode blocks are electrically connected to the one of the plurality of second bridges 40 through vias extending through the insulating layer 4.

Optionally, the auxiliary electrode layer 3 is in a same layer as the first bridge layer, and is on a side of the insulating layer 4 distal to the plurality of first electrode blocks and the plurality of second electrode blocks. Optionally, the auxiliary electrode layer 3 is in a same layer as the second bridge layer, and is on a side of the insulating layer 4 distal to the plurality of first electrode blocks and the plurality of second electrode blocks. By having the auxiliary electrode layer 3 in a same layer as the first bridge layer (or the second bridge layer), the fabricating process may be simplified. No additional mask plates are necessary as compared to the conventional touch control display panels, as the auxiliary electrode layer 3 may be patterned in a same process as that for patterning the first bridge layer (or the second bridge layer).

In some embodiments, the touch control display panel further includes a third bridge layer. Referring to FIGS. 1, 3, 4, and 6, the third bridge layer in some embodiments includes a plurality of third bridges 70, each of which at one of the plurality of intersections I. Optionally, each of the plurality of auxiliary electrodes 60 includes a plurality of auxiliary electrode blocks along the first direction, adjacent auxiliary electrode blocks spaced apart from each other at one of the plurality of intersections I. Optionally, the adjacent auxiliary electrode blocks are electrically connected to each other through one of the plurality of third bridges 70.

Optionally, each of the plurality of third bridges 70 includes a single branch. Optionally, each of the plurality of third bridges 70 includes a plurality of branches. As shown in FIGS. 1, 3, 4, and 6, each of the plurality of third bridges 70 includes a first branch 70a and a second branch 70b. The first branch 70a and the second branch 70b are spaced apart from each other so that they are insulated from one of the plurality of first bridges 30 at the one of the plurality of intersections I.

In some embodiments, and as shown in FIGS. 1, 3, 4, and 6, the plurality of third bridges 70, the plurality of auxiliary electrode blocks, and the plurality of first bridges 30 are in a same layer. Optionally, the adjacent first electrode blocks are electrically connected to the one of the plurality of first bridges 30 through vias extending through the insulating layer 4. Each of the plurality of third bridges 70 and each of the plurality of first bridges 30 at each of the plurality of intersections I are insulated from each other.

In some embodiments, the plurality of third bridges 70, the plurality of auxiliary electrode blocks, and the plurality of second bridges 40 are in a same layer. Optionally, the adjacent second electrode blocks are electrically connected to the one of the plurality of second bridges 40 through vias extending through the insulating layer 4. Each of the plurality of third bridges 70 and each of the plurality of second bridges 40 at each of the plurality of intersections I are insulated from each other.

By having the plurality of auxiliary electrode blocks and the plurality of third bridges 70 in a same layer as the first bridge layer (or the second bridge layer), the fabricating process may be simplified. No additional mask plates are necessary as compared to the conventional touch control display panels, as the plurality of auxiliary electrode blocks and the plurality of third bridges 70 may be patterned in a same process as that for patterning the first bridge layer (or the second bridge layer).

Optionally, a projection of each of the plurality of auxiliary electrodes 60 on the base substrate 0 substantially overlaps with that of one of the plurality of first touch electrodes 10. Optionally, a projection of each of the plurality of first touch electrodes 10 on the base substrate 0 completely covers that of one of the plurality of auxiliary electrodes 60. Optionally, a projection of each of the plurality of auxiliary electrodes 60 on the base substrate 0 completely covers that of one of the plurality of first touch electrodes 10.

Figure 7:
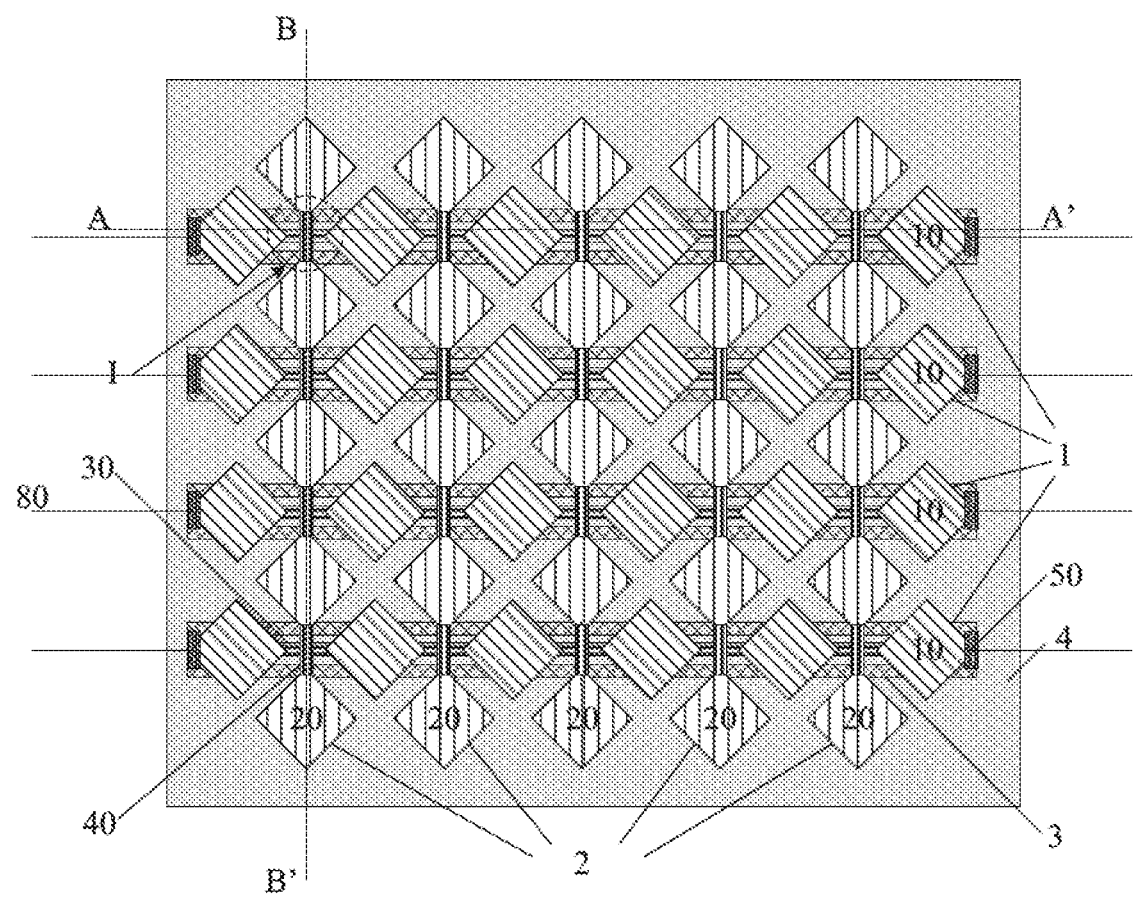
FIG. 7 is a schematic diagram illustrating the structure of a touch control display panel in some embodiments according to the present disclosure.
Figure 8:
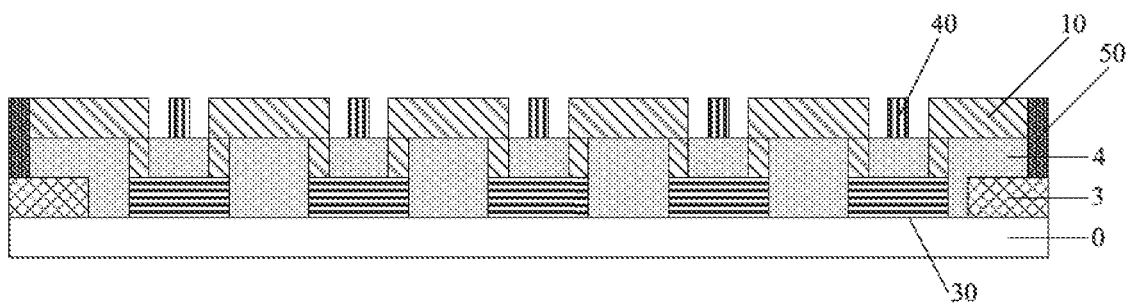
FIG. 8 is a cross-sectional view along the A-A' line of the touch control display panel in FIG. 7.
Figure 9:
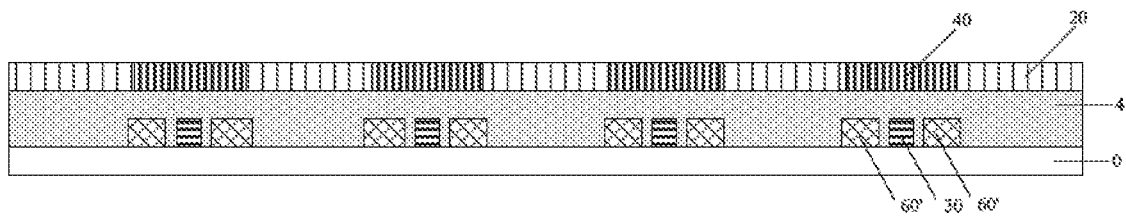
FIG. 9 is a cross-sectional view along the B-B' line of the touch control display panel in FIG. 7.
Figure 10:
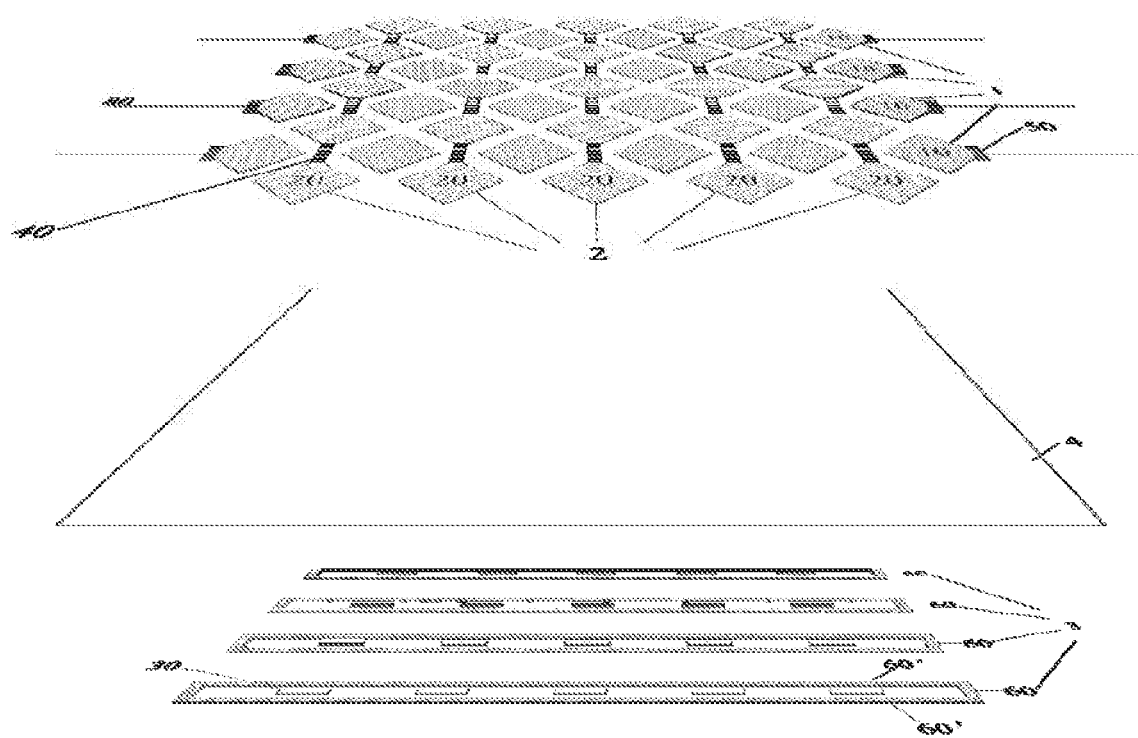
FIG. 10 is a perspective view of the touch control display panel in FIG. 7.
Figure 11:
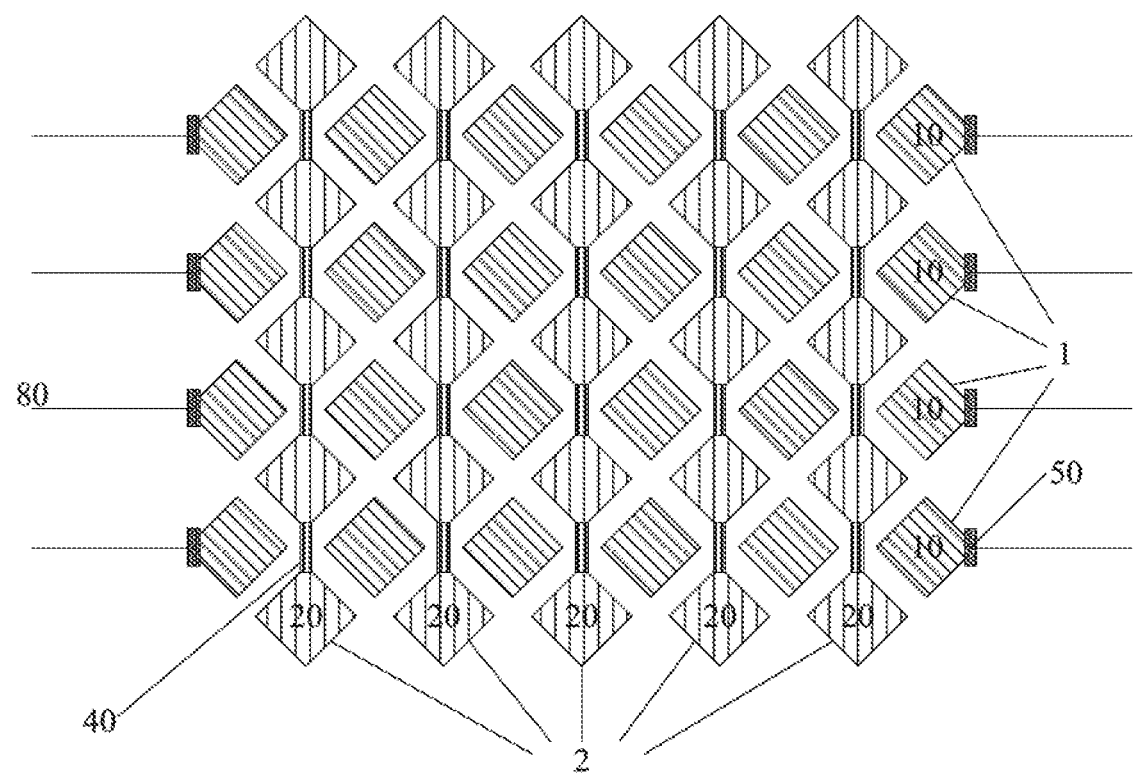
FIG. 11 is a schematic diagram illustrating the structure of the first touch electrode layer and the second touch electrode layer of the touch control display panel in FIG. 7.
Figure 12:
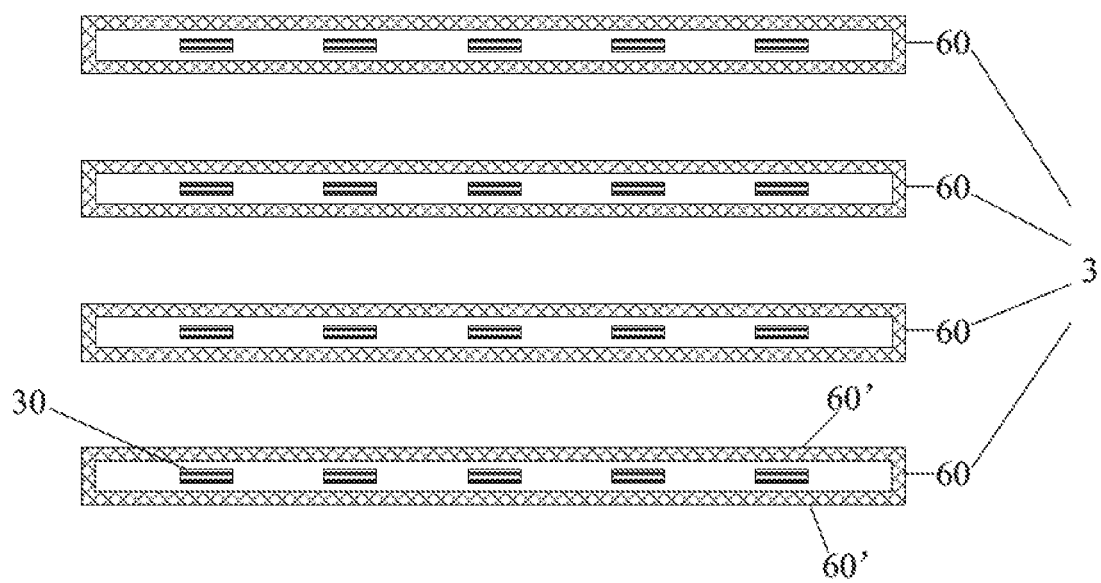
FIG. 12 is a schematic diagram illustrating the structure of the auxiliary electrode layer of the touch control display panel in FIG. 7.
Figure 13:
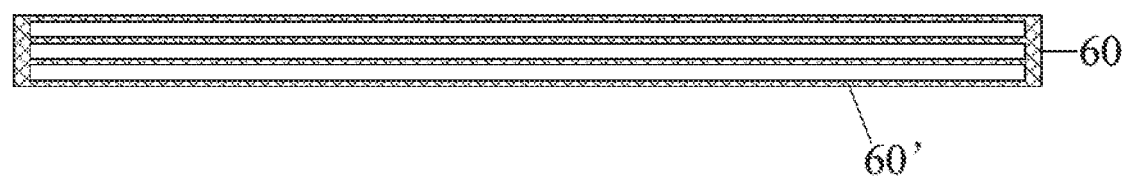
FIG. 13 is a schematic diagram illustrating the structure of the auxiliary electrode layer of the touch control display panel in some embodiments according to the present disclosure.

In some embodiments, a projection of each of the plurality of auxiliary electrodes 60 on the base substrate 0 is at least partially outside that of one of the plurality of first touch electrodes 10. FIG. 7 is a schematic diagram illustrating the structure of a touch control display panel in some embodiments according to the present disclosure. FIG. 8 is a cross-sectional view along the A-A' line of the touch control display panel in FIG. 7. FIG. 9 is a cross-sectional view along the B-B' line of the touch control display panel in FIG. 7. FIG. 10 is a perspective view of the touch control display panel in FIG. 7. FIG. 11 is a schematic diagram illustrating the structure of the first touch electrode layer and the second touch electrode layer of the touch control display panel in FIG. 7. FIG. 12 is a schematic diagram illustrating the structure of the auxiliary electrode layer of the touch control display panel in FIG. 7. Referring to FIGS. 7 to 12, in some embodiments, each of the plurality of auxiliary electrodes 60 includes at least a bar 60' extending substantially along the first direction, the bar 60' and the one of the plurality of first touch electrodes 10 are electrically connected in parallel. Optionally, each of the plurality of auxiliary electrodes 60 includes a plurality of bars 60' each extending substantially along, the first direction, and each of the plurality of bars 60' and the one of the plurality of first touch electrodes 10 are electrically connected in parallel. As shown to FIGS. 7 to 12, each of the plurality of auxiliary electrodes 60 includes two bars 60' each extending substantially along the first direction, and each of the two bars 60' is electrically connected in parallel with the one of the plurality of first touch electrodes 10. FIG. 13 is a schematic diagram illustrating the structure of the auxiliary electrode layer of the touch control display panel in some embodiments according to the present disclosure. Referring to FIG. 13, each of the plurality of auxiliary electrodes 60 includes four bars 60'.

Referring to FIGS. 7 to 11, in some embodiments, the touch control display panel further includes a first bridge layer and a second bridge layer. Optionally, the first bridge layer includes a plurality of first bridges 30, and the second bridge layer includes a plurality of second bridges 40. Each of the plurality of first bridges 30 is at one of the plurality of intersections I. Each of the plurality of second bridges 40 is at one of the plurality of intersections I. Each of the plurality of first touch electrodes 10 includes a plurality of first electrode blocks along the first direction, adjacent first electrode blocks spaced apart from each other at one of the plurality of intersections I. Each of the plurality of second touch electrodes 20 includes a plurality of second electrode blocks along the second direction, adjacent second electrode blocks spaced apart from each other at one of the plurality of intersections I. As shown in FIGS. 7 to 11, the adjacent first electrode blocks are electrically connected to each other through one of the plurality of first bridges 30; and the adjacent second electrode blocks are electrically connected to each other through one of the plurality of first bridges 40.

In some embodiments, the plurality of second bridges 40 and the plurality of second electrode blocks are in a same layer. Optionally, the plurality of first electrode blocks, the plurality of second electrode blocks, and the plurality of second bridges 40 are all in a same layer; and the plurality of first bridges 30 are in a different layer. In one example, and as shown in FIGS. 7 to 11, the plurality of second, bridges 40 and the plurality of second electrode blocks are in a same layer; the plurality of first bridges 30 are on a side of insulating layer 4 distal to the plurality of first electrode blocks; and the adjacent first electrode blocks are electrically connected to the one of the plurality of first bridges 30 through vias extending through the insulating layer 4.

In some embodiments, the plurality of first bridges 30 and the plurality of second electrode blocks are in a same layer. Optionally, the plurality of first electrode blocks, the plurality of second electrode blocks, and the plurality of first bridges 30 are all in a same layer; and the plurality of second bridges 40 are in a different layer. In one example, the plurality of first bridges 30, the plurality of first electrode blocks, and the plurality of second electrode blocks are in a same layer; the plurality of second bridges 40 are on a side of insulating layer 4 distal to the plurality of second electrode blocks; and the adjacent second electrode blocks are electrically connected to the one of the plurality of second bridges 40 through vias extending through the insulating layer 4.

Optionally, the bar 60' of the auxiliary electrode layer 3 is in a same layer as the first bridge layer, and is on a side of the insulating layer 4 distal to the plurality of first electrode blocks and the plurality of second electrode blocks. The bar 60' is insulated from the plurality of first bridges 30.

Optionally, the bar 60' of the auxiliary electrode layer 3 is in a same layer as the second bridge layer, and is on a side of the insulating layer 4 distal to the plurality of first electrode blocks and the plurality of second electrode blocks. The bar 60' is insulated from the plurality of second bridges 40.

By having the bar 60' of the auxiliary electrode layer 3 in a same layer as the first bridge layer (or the second bridge layer), the fabricating process may be simplified. No additional mask plates are necessary as compared to the conventional touch control display panels, as the bar 60' of the auxiliary electrode layer 3 may be patterned in a same process as that for patterning the first bridge layer (or the second bridge layer).

In some embodiments, the first touch electrode layer is a touch scanning electrode layer and the second touch electrode layer is a touch sensing electrode layer. Optionally, the plurality of touch signal lines connected to the contact pads are a plurality of touch scanning signal lines.

In some embodiments, the first touch electrode layer is a touch sensing electrode layer and the second touch electrode layer is a touch scanning electrode layer. Optionally, the plurality of touch signal lines connected to the contact pas are a plurality of touch sensing signal lines.

In another aspect, the present disclosure provides a method of fabricating a touch control display panel. In some embodiments, the method includes finning an auxiliary electrode layer on a base substrate; forming an insulating layer on a side of the auxiliary electrode layer distal to the base substrate; and forming a first touch electrode layer and a second touch electrode layer on a side of the insulating layer distal to the auxiliary electrode layer. Optionally, the first touch electrode layer and the auxiliary electrode layer are formed to be electrically connected in parallel. Optionally, the second touch electrode layer is formed to be insulated from the first touch electrode layer and the auxiliary electrode layer.

In some embodiments, the method further includes forming a display module on a side of the base substrate distal to the auxiliary electrode layer, and the auxiliary electrode layer is formed to at least partially shield the second touch electrode layer from noise signals generated in the display module.

In some embodiments, the step of forming the first touch electrode layer includes forming a plurality of first touch electrodes, each of which extending substantially along a first direction; the step of forming the second touch electrode layer includes forming a plurality of second touch electrodes, each of which extending substantially along a second direction; the plurality of first touch electrodes and the plurality of second touch electrodes are formed to cross over each other forming a plurality of intersections. Optionally, the step of forming the auxiliary electrode layer includes forming a plurality of auxiliary electrodes extending substantially along the first direction; and each of the plurality of auxiliary electrodes and one of the plurality of first touch electrodes are formed to be electrically connected in parallel.

In some embodiments, the method further includes forming a plurality of touch signal lines, and a plurality of contact pads. Optionally, each of the plurality of touch signal lines are formed to be electrically connected to one of the plurality of first touch electrodes and one of the plurality of auxiliary electrodes at a contact pad.

Optionally, each of the plurality of auxiliary electrodes is formed to have a shape different from that of one of the plurality of first touch electrodes. Optionally, each of the plurality of auxiliary electrodes is thrilled to have a shape substantially the same as that of one of the plurality of first touch electrodes. Optionally, projections of the plurality of auxiliary electrodes on the base substrate substantially overlap with those of the plurality of first touch electrodes. Optionally, projections of the plurality of auxiliary electrodes on the base substrate completely cover those of the plurality of first touch electrodes. Optionally, projections of the plurality of first touch electrodes on the base substrate completely cover those of the plurality of auxiliary electrodes.

In some embodiments, the method further includes forming a first bridge layer; and forming a second bridge layer. Optionally, the step of forming the first bridge layer includes forming a plurality of first bridges. Optionally, the step of forming the second bridge layer includes forming a plurality of second bridges.

In some embodiments, the step of forming, the first touch electrode layer includes forming a plurality of first touch electrodes, each of which is formed to include a plurality of first electrode blocks along the first direction, adjacent first electrode blocks spaced apart from each other at one of the plurality of intersections. Each of the plurality of first bridges is formed at one of the plurality of intersections. Adjacent first electrode blocks are formed to be electrically connected to each other through one of the plurality of first bridges.

In some embodiments, the step of forming the second touch electrode layer includes forming a plurality of second touch electrodes, each of which is formed to include a plurality of second electrode blocks along the second direction, adjacent second electrode blocks spaced apart from each other at one of the plurality of intersections. Each of the plurality of second bridges is formed at one of the plurality of intersections. Adjacent second electrode blocks are formed to be electrically connected to each other through one of the plurality of second bridges.

In some embodiments, the method includes forming the plurality of second bridges and the plurality of second electrode blocks in a same patterning process, e.g., in a same layer, using a same material and a same mask plate. Optionally, the method includes forming the plurality of first electrode blocks, the plurality of second electrode blocks, and the plurality of second bridges in a same process, e.g., in a same layer, using a same material and a same mask plate. Optionally, the method includes forming the plurality of first bridges are in a separate process, e.g., in a different layer, using a different mask plate. In one example, the method includes turning the plurality of first bridges on the base substrate; forming the insulating layer on a side of the plurality of first bridges distal to the base substrate; and forming the plurality of second bridges and the plurality of second electrode blocks in a same process and on a side of the insulating layer distal to the plurality of first bridges. Optionally, the method further includes forming vias extending through the insulating layer, the adjacent first electrode blocks are electrically connected to the one of the plurality of first bridges 30 through the vias.

In some embodiments, the method includes forming the plurality of first bridges and the plurality of second electrode blocks are in a same patterning process, e.g., in a same layer, using a same material and a same mask plate. Optionally, the method includes forming the plurality of first electrode blocks, the plurality of second electrode blocks, and the plurality of first bridges in a same process, e.g., in a same layer, using a same material and a same mask plate. Optionally, the method includes forming the plurality of second bridges are in a separate process, e.g., in a different layer, using a different mask plate, in one example, the method includes forming the plurality of second bridges on the base substrate; forming the insulating layer on a side of the plurality of second bridges distal to the base substrate; and forming the plurality of first bridges, the plurality of first electrode blocks, and the plurality of second electrode blocks in a same process and on a side of the insulating layer distal to the plurality of second bridges. Optionally, the method further includes forming vias extending through the insulating layer, the adjacent second electrode blocks are electrically connected to the one of the plurality of second bridges through the vias.

In some embodiments, the method includes forming the auxiliary electrode layer and the first bridge layer in a same patterning process, e.g., in a same layer, using a same material and a same mask plate, and on a side of the insulating layer distal to the plurality of first electrode, blocks and the plurality of second electrode blocks. Optionally, the method includes forming the auxiliary electrode layer and the second bridge layer in a same patterning process, e.g., in a same layer, using a same material and a same mask plate, and on a side of the insulating layer distal to the plurality of first electrode blocks and the plurality of second electrode blocks. By forming the auxiliary electrode layer in a same process as the first bridge layer (or the second bridge layer), the fabricating process are simplified. No additional mask plates are necessary as compared to the conventional touch control display panels, as the auxiliary electrode layer is patterned in a same process as that for patterning the first bridge layer (or the second bridge layer).

In some embodiments, the method includes forming a third bridge layer. Optionally, the step of forming the third bridge layer includes forming a plurality of third bridges, each of which formed at one of the plurality of intersections. Optionally, the step of forming the auxiliary electrode layer includes limning a plurality of auxiliary electrodes, each of which is formed to include a plurality of auxiliary electrode blocks along the first direction. Optionally, adjacent auxiliary electrode blocks are formed to be spaced apart from each other at one of the plurality of intersections. Optionally, the adjacent auxiliary electrode blocks are formed to be electrically connected to each other through one of the plurality of third bridge.

In some embodiments, the method includes forming the plurality of third bridges, the plurality of auxiliary electrode blocks, and the plurality of first bridges in a same patterning process, e.g., in a same layer, using a same material and a same mask plate. Optionally, the method further includes forming vias extending through the insulating layer, the adjacent first electrode blocks are formed to be electrically connected to the one of the plurality of first bridges through vias. Each of the plurality of third bridges and each of the plurality of first bridges at each of the plurality of intersections are formed to be insulated from each other.

In some embodiments, the method includes forming the plurality of third bridges, the plurality of auxiliary electrode blocks, and the plurality of second bridges in a same patterning process, e.g., in a same layer, using a same material and a same mask plate. Optionally, the method flutter includes forming vias extending through the insulating layer, the adjacent second electrode blocks are electrically connected to the one of the plurality of second bridges through vias. Each of the plurality of third bridges and each of the plurality of second bridges at each of the plurality of intersections are formed to be insulated from each other.

By forming the plurality of auxiliary electrode blocks and the plurality of third bridges in a same process as the first bridge layer (or the second bridge layer), the fabricating process are greatly simplified. No additional mask plates are necessary as compared to the conventional touch control display panels, as the plurality of auxiliary electrode blocks and the plurality of third bridges can be patterned in a same process as that for patterning the first bridge layer (or the second bridge layer).

In some embodiments, the step of forming the auxiliary electrode layer includes forming a plurality of auxiliary electrodes, each of which is formed to include at least a bar extending substantially along the first direction, the bar and the one of the plurality of first touch electrodes are formed to be electrically connected in parallel. Optionally, the step of forming each of the plurality of auxiliary electrodes includes forming a plurality of bars, each of which formed to extend substantially along the first direction and each of the plurality of bars and the one of the plurality of first touch electrodes are formed to be electrically connected in parallel. Optionally, the step of forming each of the plurality of auxiliary electrodes includes forming two bars each extending substantially along the first direction, and each of the two bars is formed to be electrically connected in parallel with the one of the plurality of first touch electrodes.

In some embodiments, the method further includes forming a first bridge layer; and forming a second bridge layer. Optionally, the step of forming the first bridge layer includes forming a plurality of first bridges. Optionally, the step of forming the second bridge layer includes forming a plurality of second bridges. In some embodiments, the step of forming the first touch electrode layer includes forming a plurality of first touch electrodes, each of which is formed to include a plurality of first electrode blocks along the first direction, adjacent first electrode blocks spaced apart from each other at one of the plurality of intersections. Each of the plurality of first bridges is formed at one of the plurality of intersections. Adjacent first electrode blocks are formed to be electrically connected to each other through one of the plurality of first bridges. In some embodiments, the step of forming the second touch electrode layer includes forming a plurality of second touch electrodes, each of which is formed to include a plurality of second electrode blocks along the second direction, adjacent second electrode blocks spaced apart from each other at one of the plurality of intersections. Each of the plurality of second bridges is formed at one of the plurality of intersections. Adjacent second electrode blocks are formed to be electrically connected to each other through one of the plurality of second bridges.

In some embodiments, the method includes forming the plurality of second bridges and the plurality of second electrode blocks are in a same patterning process, e.g., in a same layer, using a same material and a same mask plate. Optionally, the method includes forming the plurality of first electrode blocks, the plurality of second electrode blocks, and the plurality of second bridges in a same process, e.g., in a same layer, using it same material and a same mask plate. Optionally, the method includes forming the plurality of first bridges are in a separate process, e.g., in a different layer, using a different mask plate. In one example, the method includes forming the plurality of first bridges on the base substrate; forming the insulating layer on a side of the plurality of first bridges distal to the base substrate; and forming the plurality of second bridges and the plurality of second electrode blocks in a same process and on a side of the insulating layer distal to the plurality of first bridges. Optionally, the method further includes forming vias extending through the insulating layer, the adjacent first electrode blocks are electrically connected to the one of the plurality of first bridges 30 through the vias.

In some embodiments, the method includes forming the plurality of first bridges and the plurality of second electrode blocks are in a same patterning process, e.g., in a same layer, using a same material and a same mask plate. Optionally, the method includes forming the plurality of first electrode blocks, the plurality of second electrode blocks, and the plurality of first bridges in a same process, e.g., in a same layer, using a same material and a same mask plate. Optionally, the method includes forming the plurality of second bridges are in a separate process, e.g., in a different layer, using a different mask plate. In one example, the method includes forming the plurality of second bridges on the base substrate; forming the insulating layer on a side of the plurality of second bridges distal to the base substrate; and forming the plurality of first bridges, the plurality of first electrode blocks, and the plurality of second electrode blocks in a same process and on a side of the insulating layer distal to the plurality of second bridges. Optionally, the method further includes forming vias extending through the insulating layer, the adjacent second electrode blocks are electrically connected to the one of the plurality of second bridges through the vias.

In some embodiments, the method includes forming the bar of the auxiliary electrode layer and the first bridge layer in a same patterning process, e.g., in a same layer, using a same material and a same mask plate, and on a side of the insulating layer distal to the plurality of first electrode blocks and the plurality of second electrode blocks. The bar is formed to be insulated from the plurality of first bridges.

In some embodiments, the method includes forming the bar of the auxiliary electrode layer and the second bridge layer in a same patterning process, e.g., in a same layer, using a same material and a same mask plate, and on a side of the insulating layer distal to the plurality of first electrode blocks and the plurality of second electrode blocks. The bar is formed to be insulated from the plurality of second bridges.

By forming the bar of the auxiliary electrode layer in a same process as the first bridge layer (or the second bridge layer), the fabricating process are greatly simplified. No additional mask plates are necessary as compared to the conventional touch control display panels, as the bar of the auxiliary electrode layer can be patterned in a same process as that for patterning the first bridge layer (or the second bridge layer).

In another aspect, the present disclosure further provides a touch substrate. In some embodiments, the touch substrate includes a base substrate; an auxiliary electrode layer on the base substrate; an insulating layer on a side of the auxiliary electrode layer distal to the base substrate; and a first touch electrode layer and a second touch electrode layer on a side of the insulating layer distal to the auxiliary electrode layer. Optionally, the first touch electrode layer and the auxiliary electrode layer are electrically connected in parallel. Optionally, the second touch electrode layer is insulated from the first touch electrode layer and the auxiliary electrode layer.

In some embodiments, the first touch electrode layer includes a plurality of first touch electrodes, each of which extending substantially along a first direction; the second touch electrode layer includes a plurality of second touch electrodes, each of which extending substantially along a second direction; and the auxiliary electrode layer includes a plurality of auxiliary electrodes extending substantially along the first direction. The plurality of first touch electrodes and the plurality of second touch electrodes cross over each other forming a plurality of intersections, the plurality of auxiliary electrodes and the plurality of second touch electrodes also cross over each other at the plurality of intersections. Each of the plurality of auxiliary electrodes and one of the plurality of first touch electrodes are electrically connected in parallel.

In some embodiments, the touch substrate further includes a plurality of touch signal lines, each of which electrically connected to one of the plurality of first touch electrodes and one of the plurality of auxiliary electrodes at a contact pad.

Optionally, each of the plurality of auxiliary electrodes has a shape different from that of one of the plurality of first touch electrodes. Optionally, each of the plurality of auxiliary electrodes has a shape substantially the same as that of one of the plurality of first touch electrodes. Optionally, projections of the plurality of auxiliary electrodes on the base substrate substantially overlap with those of the plurality of first touch electrodes. Optionally, projections of the plurality of auxiliary electrodes on the base substrate completely cover those of the plurality of first touch electrodes. Optionally, projections of the plurality of first touch electrodes on the base substrate completely cover those of the plurality of auxiliary electrodes.

In some embodiments, the touch substrate further includes a first bridge layer and a second bridge layer. Optionally, each of the plurality of first touch electrodes includes a plurality of first electrode blocks along the first direction, adjacent first electrode blocks spaced apart from each other at one of the plurality of intersections. Optionally, each of the plurality of second touch electrodes includes a plurality of second electrode blocks along the second direction, adjacent second electrode blocks spaced apart from each other at one of the plurality of intersections. Optionally, the first bridge layer includes a plurality of first bridges, each of which at one of the plurality of intersections, the adjacent first electrode blocks electrically connected to each other through one of the plurality of first bridges. Optionally, the second bridge layer includes a plurality of second bridges, each of which at one of the plurality of intersections, the adjacent second electrode blocks electrically connected to each other through one of the plurality of second bridges.

In some embodiments, the plurality of second bridges and the plurality of second electrode blocks are in a same layer. Optionally, the plurality of first bridges are on a side of insulating layer distal to the plurality of first touch electrodes. Optionally, the adjacent first electrode blocks electrically connected to the one of the plurality of first bridges through vias extending through the insulating layer.

In some embodiments, the touch substrate further includes a third bridge layer. Optionally, each of the plurality of auxiliary electrodes includes a plurality of auxiliary electrode blocks along the first direction, adjacent auxiliary electrode blocks spaced apart from each other at one of the plurality of intersections. Optionally, the third bridge layer includes a plurality of third bridges, each of which at one of the plurality of intersections, the adjacent auxiliary electrode blocks electrically connected to each other through one of the plurality of third bridges.

In some embodiments, the plurality of third bridges, the plurality of auxiliary electrode blocks, and the plurality of first bridges are in a same layer. Optionally, the adjacent first electrode blocks electrically connected to the one of the plurality of first bridges through vias extending through the insulating layer. Optionally, each of the plurality of third bridges and each of the plurality of first bridges at each of the plurality of intersections are insulated from each other.

Optionally, a projection of each of the plurality of auxiliary electrodes on the base substrate substantially overlaps with that of one of the plurality of first touch electrodes. Optionally, a projection of each of the plurality of first touch electrodes on the base substrate completely covers that of one of the plurality of auxiliary electrodes.

In some embodiments, each of the plurality of auxiliary electrodes includes a bar extending substantially along the first direction. Optionally, the bar and the one of the plurality of first touch electrodes are electrically connected in parallel. Optionally, each of the plurality of auxiliary electrodes includes a plurality of bars, each of which extending substantially along the first direction. Optionally, each of the plurality of bars is electrically connected in parallel with the one of the plurality of first touch electrodes. Optionally, each of the plurality of auxiliary electrodes includes two bars, each of which extending substantially along the first direction. Optionally, each of the two bars is electrically connected in parallel with the one of the plurality of first touch electrodes.

In some embodiments, the touch substrate further includes a first bridge layer and a second bridge layer. Optionally, each of the plurality of first touch electrodes includes a plurality of first electrode blocks along the first direction, adjacent first electrode blocks spaced apart from each other at one of the plurality of intersections. Optionally, each of the plurality of second touch electrodes includes a plurality of second electrode blocks along the second direction, adjacent second electrode blocks spaced apart from each other at one of the plurality of intersections. Optionally, the first bridge layer includes a plurality of first bridges, each of which at one of the plurality of intersections, the adjacent first electrode blocks electrically connected to each other through one of the plurality of first bridges. Optionally, the second bridge layer includes a plurality of second bridges, each of which at one of the plurality of intersections, the adjacent second electrode blocks electrically connected to each other through one of the plurality of second bridges. Optionally, the bar and the plurality of first bridges are in a same layer. The bar is insulated from the plurality of first bridges.

In some embodiments, the first touch electrode layer is a touch scanning electrode layer and the second touch electrode layer is a touch sensing electrode layer. Optionally, the plurality of touch signal lines connected to the contact pads are a plurality of touch scanning signal lines.

In some embodiments, the first touch electrode layer is a touch sensing electrode layer and the second touch electrode layer is a touch scanning electrode layer. Optionally, the plurality of touch signal lines connected to the contact pads are a plurality of touch sensing signal lines.

In another aspect, the present disclosure provides a touch control display apparatus having a touch control display panel described herein or fabricated by a method describe herein, or a touch substrate described herein. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control display panel, comprising:
    a base substrate;
    an auxiliary electrode layer on the base substrate, the auxiliary electrode layer comprising a plurality of auxiliary electrodes, a respective one of the plurality of auxiliary electrodes extending substantially along the first direction;
    an insulating layer on a side of the auxiliary electrode layer away from the base substrate;
    a first touch electrode layer and a second touch electrode layer in a same layer and on a side of the insulating layer away from the auxiliary electrode layer, the first touch electrode layer comprising a plurality of first touch electrodes, a respective one of the plurality of first touch electrodes extending substantially along a first direction, the second touch electrode layer comprising a plurality of second touch electrodes, a respective one of the plurality of second touch electrodes extending substantially along a second direction; and
    a contact pad on an edge of the first touch electrode layer;
    wherein the insulating layer spaces apart a respective first electrode block of the respective one of the plurality of first touch electrodes and a respective auxiliary electrode block of the respective one of the plurality of auxiliary electrodes;
    the contact pad, extending through a thickness direction of the insulating layer, is directly connected to the respective first electrode block on a first side of the insulating layer, and is also directly connected to the respective auxiliary electrode block on a second side of the insulating layer, electrically connecting the respective one of the plurality of first touch electrodes and the respective one of the plurality of auxiliary electrodes in parallel, the first side and the second side opposite to each other;
    the auxiliary electrode layer is in a different layer from the first touch electrode layer and the second touch electrode layer;
    the second touch electrode layer is insulated from the first touch electrode layer and the auxiliary electrode layer; and
    an orthographic projection of the respective one of the plurality of auxiliary electrodes on the base substrate at least partially overlaps with an orthographic projection of the respective one of the plurality of first touch electrodes on the base substrate.

2. The touch control display panel of claim 1, further comprising a display module on a side of the base substrate distal to the auxiliary electrode layer;
    wherein the auxiliary electrode layer configured to at least partially shield the second touch electrode layer from noise signals generated in the display module.

3. The touch control display panel of claim 1, wherein the contact pad covers a portion of a lateral side of the insulating layer, the lateral side connecting the first side and the second side.

4. The touch control display panel of claim 1, further comprising a plurality of touch signal lines;
    wherein the contact pad is directly connected to a respective one of the plurality of touch signal lines, thereby electrically connecting the respective one of the plurality of touch signal lines to the respective first electrode block and to the respective auxiliary electrode block through the contact pad.

5. The touch control display panel of claim 1, wherein each of the plurality of auxiliary electrodes has a shape different from that of one of the plurality of first touch electrodes.

6. The touch control display panel of claim 1, wherein each of the plurality of auxiliary electrodes has a shape substantially the same as that of one of the plurality of first touch electrodes
    the orthographic projection of the respective one of the plurality of auxiliary electrodes on the base substrate substantially overlaps with the orthographic projection of the respective one of the plurality of first touch electrodes on the base substrate.

7. The touch control display panel of claim 1, further comprising a first bridge layer and a second bridge layer;
    wherein the plurality of first touch electrodes and the plurality of second touch electrodes cross over each other forming a plurality of intersections;
    each of the plurality of first touch electrodes comprises a plurality of first electrode blocks along the first direction, adjacent first electrode blocks spaced apart from each other at one of the plurality of intersections;
    the first bridge layer comprises a plurality of first bridges, each of which at one of the plurality of intersections, the adjacent first electrode blocks electrically connected to each other through one of the plurality of first bridges;
    each of the plurality of second touch electrodes comprises a plurality of second electrode blocks along the second direction, adjacent second electrode blocks spaced apart from each other at one of the plurality of intersections; and the second bridge layer comprises a plurality of second bridges, each of which at one of the plurality of intersections, the adjacent second electrode blocks electrically connected to each other through one of the plurality of second bridges.

8. The touch control display panel of claim 7, wherein the plurality of second bridges and the plurality of second electrode blocks are in a same layer;
the plurality of first bridges are on a side of insulating layer distal to the plurality of first electrode blocks; and
the adjacent first electrode blocks electrically connected to the one of the plurality of first bridges through vias extending through the insulating layer.

9. The touch control display panel of claim 7, further comprising a third bridge layer;
wherein each of the plurality of auxiliary electrodes comprises a plurality of auxiliary electrode blocks along the first direction, adjacent auxiliary electrode blocks spaced apart from each other at one of the plurality of intersections;
the third bridge layer comprises a plurality of third bridges, each of which at one of the plurality of intersections, the adjacent auxiliary electrode blocks electrically connected to each other through one of the plurality of third bridges.

10. The touch control display panel of claim 9, wherein the plurality of third bridges, the plurality of auxiliary electrode blocks, and the plurality of first bridges are in a same layer;
the adjacent first electrode blocks electrically connected to the one of the plurality of first bridges through vias extending through the insulating layer; and
each of the plurality of third bridges and each of the plurality of first bridges at each of the plurality of intersections are insulated from each other.

11. The touch control display panel of claim 1, wherein each of the plurality of auxiliary electrodes comprises a bar extending substantially along the first direction; and
the bar and the one of the plurality of first touch electrodes are electrically connected in parallel.

12. The touch control display panel of claim 11, wherein each of the plurality of auxiliary electrodes comprises a plurality of bars, each of which extending substantially along the first direction; and
each of the plurality of bars and the one of the plurality of first touch electrodes are electrically connected in parallel.

13. The touch control display panel of claim 11, further comprising a first bridge layer and a second bridge layer;
wherein the plurality of first touch electrodes and the plurality of second touch electrodes cross over each other forming a plurality of intersections;
each of the plurality of first touch electrodes comprises a plurality of first electrode blocks along the first direction, adjacent first electrode blocks spaced apart from each other at one of the plurality of intersections;
the first bridge layer comprises a plurality of first bridges, each of which at one of the plurality of intersections, the adjacent first electrode blocks electrically connected to each other through one of the plurality of first bridges;
each of the plurality of second touch electrodes comprises a plurality of second electrode blocks along the second direction, adjacent second electrode blocks spaced apart from each other at one of the plurality of intersections; and the second bridge layer comprises a plurality of second bridges, each of which at one of the plurality of intersections, the adjacent second electrode blocks electrically connected to each other through one of the plurality of second bridges.

14. The touch control display panel of claim 13, wherein the bar and the plurality of first bridges are in a same layer; and
the bar is insulated from the plurality of first bridges.

15. The touch control display panel of claim 1, wherein the first touch electrode layer is a touch scanning electrode layer and the second touch electrode layer is a touch sensing electrode layer.

16. The touch control display panel of claim 4, wherein the plurality of touch signal lines are a plurality of touch scanning signal lines;
the plurality of first touch electrodes are a plurality of touch scanning electrodes; and
the plurality of second touch electrodes are a plurality of touch sensing electrodes.

17. A touch control display apparatus, comprising the touch control display panel of claim 1.

18. A touch control structure, comprising:
an auxiliary electrode layer comprising a plurality of auxiliary electrodes, a respective one of the plurality of auxiliary electrodes extending substantially along the first direction;
an insulating layer on the auxiliary electrode layer;
a first touch electrode layer and a second touch electrode layer in a same layer and on a side of the insulating layer away from the auxiliary electrode layer, the first touch electrode layer comprising a plurality of first touch electrodes, a respective one of the plurality of first touch electrodes extending substantially along a first direction, the second touch electrode layer comprising a plurality of second touch electrodes, a respective one of the plurality of second touch electrodes extending substantially along a second direction; and
a contact pad on an edge of the first touch electrode layer;
wherein the insulating layer spaces apart a respective first electrode block of the respective one of the plurality of first touch electrodes and a respective auxiliary electrode block of the respective one of the plurality of auxiliary electrodes;
the contact pad, extending through a thickness direction of the insulating layer, is directly connected to the respective first electrode block on a first side of the insulating layer, and is also directly connected to the respective auxiliary electrode block on a second side of the insulating layer, electrically connecting the respective one of the plurality of first touch electrodes and the respective one of the plurality of auxiliary electrodes in parallel, the first side and the second side opposite to each other;
the auxiliary electrode layer is in a different layer from the first touch electrode layer and the second touch electrode layer;
the second touch electrode layer is insulated from the first touch electrode layer and the auxiliary electrode layer; and
an orthographic projection of the respective one of the plurality of auxiliary electrodes on the insulating layer at least partially overlaps with an orthographic projection of the respective one of the plurality of first touch electrodes on the insulating layer.

* * * * *